United States Patent [19]

Dirks et al.

[11] 3,972,542
[45] Aug. 3, 1976

[54] TRAILER ANTI-JACKKNIFING APPARATUS

[76] Inventors: Arthur A. Dirks, 5357 N. 47th St., Omaha, Nebr. 68104; William G. Meyers, R.R. No. 1, Gretna, Nebr. 68028

[22] Filed: Feb. 7, 1975

[21] Appl. No.: 547,818

[52] U.S. Cl. ............................................... 280/432
[51] Int. Cl.² ........................................ B62D 53/06
[58] Field of Search .................................. 280/432

[56] References Cited
UNITED STATES PATENTS

| | | | |
|---|---|---|---|
| 2,714,017 | 7/1955 | Mendez | 280/432 |
| 2,962,301 | 11/1960 | Leinbach | 280/432 |
| 3,837,678 | 9/1974 | Cicero | 280/432 |

*Primary Examiner*—M. H. Wood, Jr.
*Assistant Examiner*—R. Schrecengost
*Attorney, Agent, or Firm*—George R. Nimmer

[57] ABSTRACT

Anti-jackknifing apparatus for combination with conventional tractor-drawn trailers wherein the tractor includes a forwardly disposed operator's cab and a rearwardly disposed fifth wheel assembly having a skid-plate. The skid-plate conventionally includes a pair of longitudinally rearwardly extending guide-lugs having therebetween a V-slot horizontally converging toward an upright kingpin or other pivotal association with the trailer. The anti-jackknifing apparatus comprises a generally horizontal longitudinally extending restraining-tongue terminating as a forward head-part, which head-part has an inactive normal-station and also an anti-jackknifing extended-station respectively located remote from and abuttably within the skid-plate V-slot during a potentially jackknifing panic situation. The restraining-tongue head-part is actuatably reciprocated between normal-station and extended-station and remotely controlled from the tractor operator's cab during a potentially jackknifing panic situation, and especially at extended-station the restraining-tongue is stationarily rigidly associated with the trailer underside.

11 Claims, 5 Drawing Figures

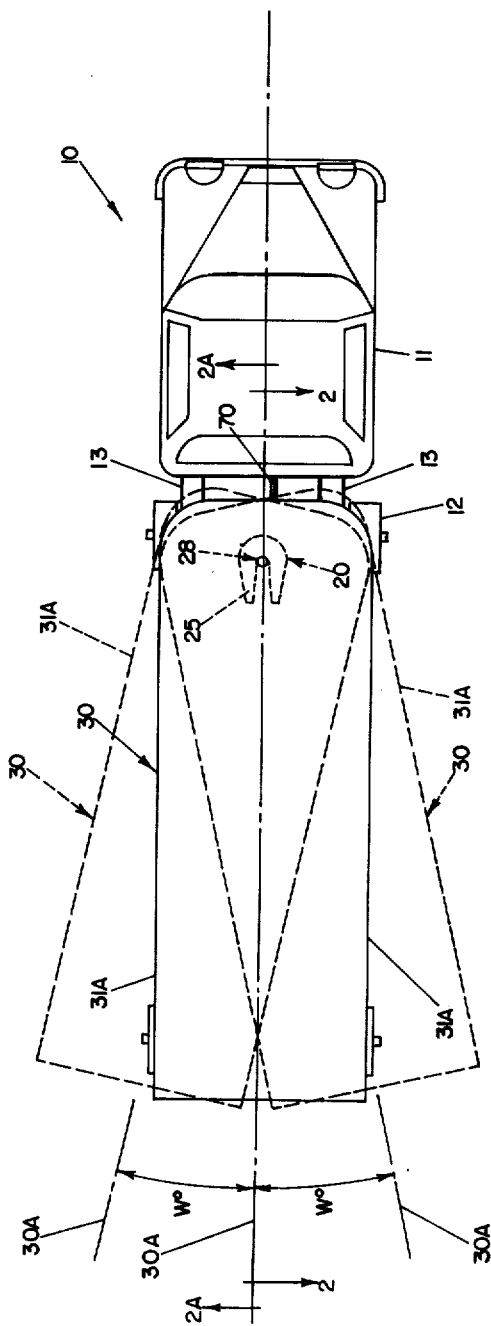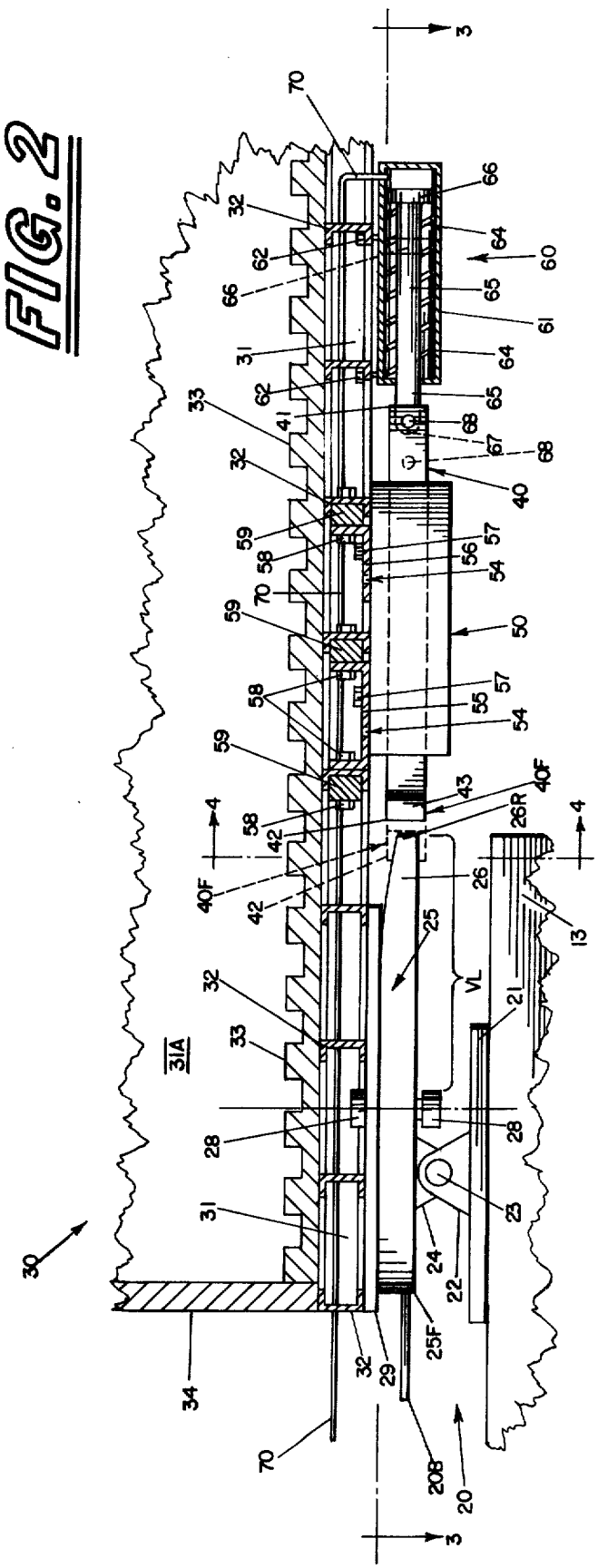

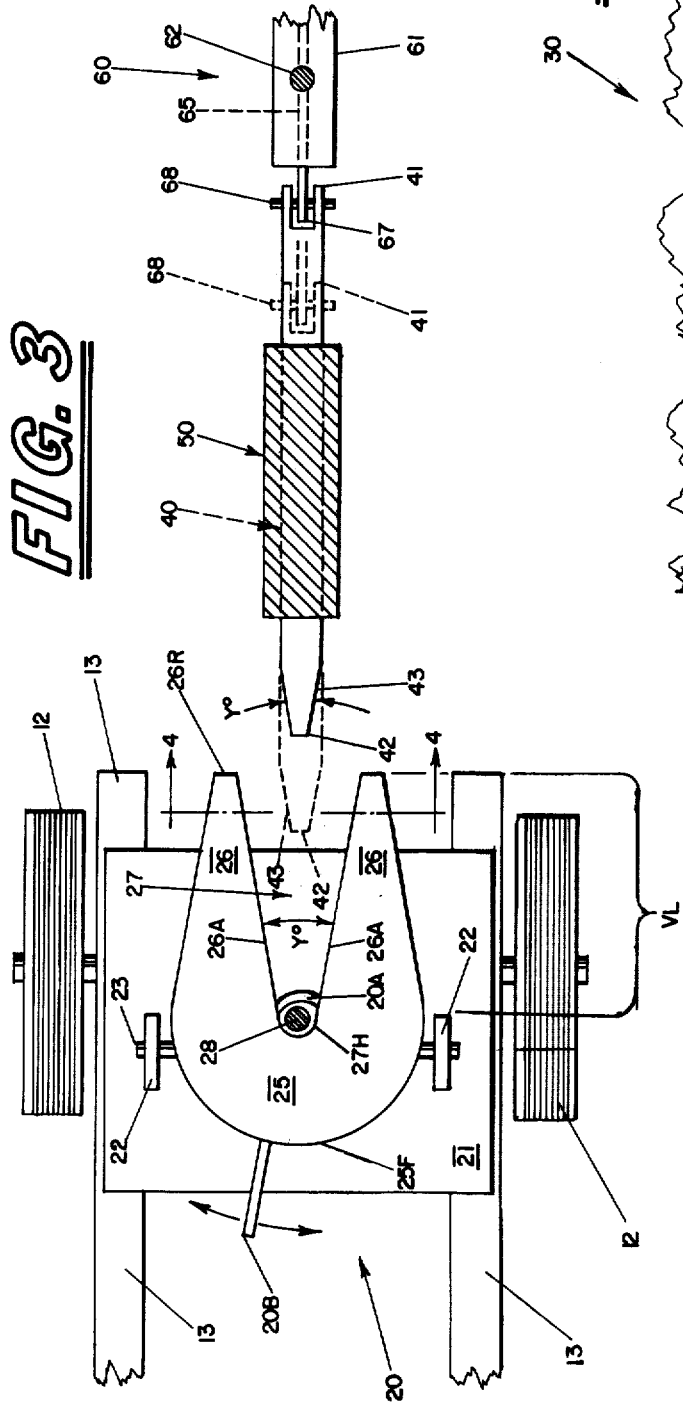
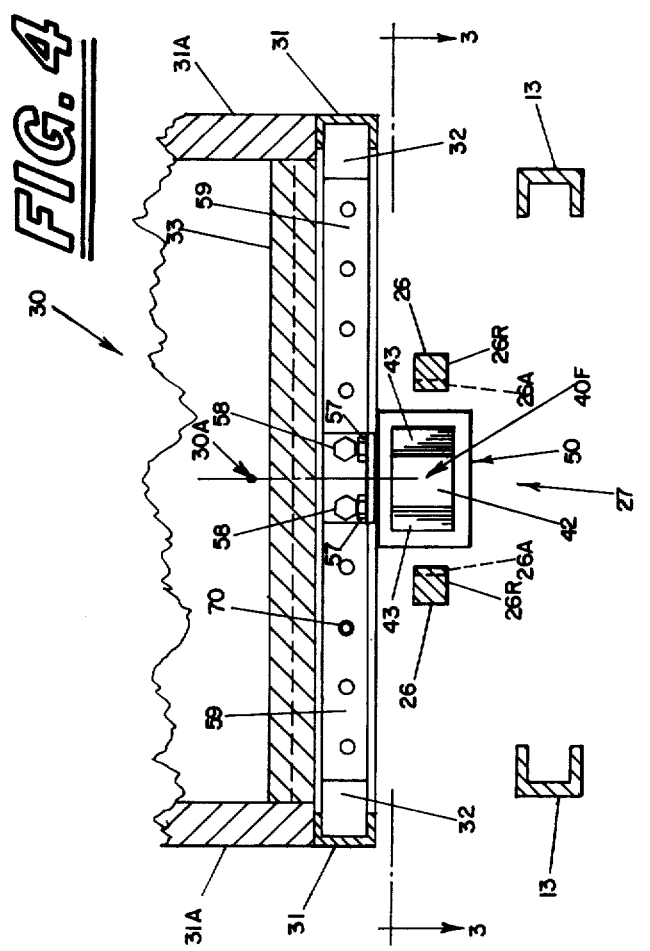
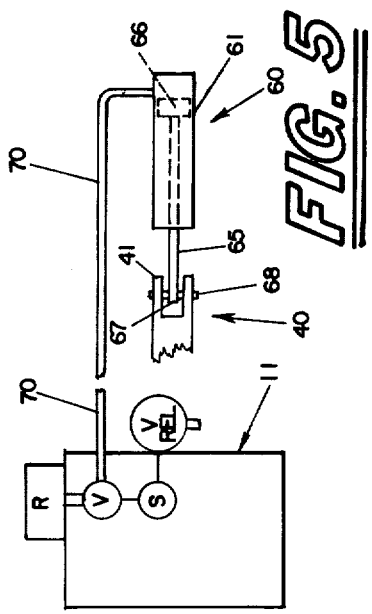

TRAILER ANTI-JACKKNIFING APPARATUS

Tractor-drawn trailers employed in the overland trucking industry conventionally utilize an upright kingpin as the removable pivotal connection which defines the vertical pivot-axis between the tractor and trailer. Self-propelled overland tractors traditionally include a forwardly disposed operator's cab and also a rearwardly disposed fifth wheel assembly unit having a generally horizontal skid-plate tiltably mounted on a trunion. The skid-plate part comprises a pair of longitudinally rearwardly extending guide-lugs having rearwardly divergent inward-sides terminating at transversely opposed rear-tips to provide a V-slot forwardly converging for a longitudinal finite-length from the rear-tips to an upright kingpin extending integrally downwardly from the trailer. The tractor fifth wheel unit also includes a latching arrangement for a removable pivotal connection between the tractor and trailer and with such freedom about the vertical pivot-axis that the tractor-drawn trailer vehicle is able to negotiate sharp corner turns.

In the overland trucking industry, the "jackknifed" condition describes the inadvertent gross misalignment of the longitudinally extending trailer about its vertical pivot-axis connection which is normally brought about by improper application of the brakes while moving at some substantial speed. The jackknife condition frequently leads to a disastrous loss of control which is a particular problem when the vehicular roadway is slick from rain or ice. Prior art workers have attempted to develop jackknife prevention means which are intended to be controllably actuated by the tractor operator from the cab portion in panic situations, i.e., whenever his application of the vehicle brakes causes the trailer to pivot too rapidly about the vertical pivot-axis. For example, in such panic situations, the trailer must be prevented from pivoting more than about 5°–15° about the pivot-axis lest the momentum of the swerving trailer becomes practically unstoppable to slam broadside against the tractor operator's cab. Accordingly, prior art workers have recognized the necessity for a trailer jackknifing resistance means that becomes effective substantially within the 5°–10° range and controllably actuatable from the tractor cab by the vehicle operating person. However, prior art anti-jackknifing apparatus tend to be unreliable or expensive for one reason or the other or more appropriate to original equipment form rather than as readily installable addendum accessory for existing tractor-drawn trailer vehicles.

It is accordingly the general object of the present invention to provide improved jackknifing resistance apparatus for tractor-drawn trailer vehicles and which is exceedingly sturdy and reliable yet of relatively inexpensive construction that it is admirably suited for use as a readily installable addendum accessory for numerous models and styles of existing vehicles.

Related and ancillary objects of the present invention include the provision of anti-jackknifing apparatus which are controllably actuatable by the vehicle operator from within the tractor cab while encountering panic driving situations and before the swerving pivotal trailer has become misaligned by about 10°, the pivot limiting means being unusually reliable both in its actuability and in its physical strength to effectively resist the momentum of the swerving trailer.

With the above and other objects and advantages in view, which will become more apparent as this description proceeds, the trailer anti-jackknifing apparatus of the present invention generally comprises: a generally horizontal longitudinally extending restraining-tongue terminating as a forward head-part, which head-part has an inactive normal-station and also an anti-jackknifing extended-station respectively located remote from and abuttably within the skid-plate V-slot. The restraining-tongue especially at extended-station rigidly extends from the trailer underside and is actuatably reciprocatable between normal-station and extended-station and remotely controllable from the tractor operator's cab during a potentially jackknifing roadway panic situation.

In the drawing, wherein like characters refer to like parts in the several views, and in which:

FIG. 1 is a top plan view of a typical tractor-drawn trailer vehicular combination having a representative embodiment of anti-jackknifing apparatus of the present invention (apparatus obscured in FIG. 1 by the overlying trailer).

FIG. 2 is a sectional elevational view taken through the tractor-to-trailer vertical pivot-axis and along the longitudinal direction line 2—2 of FIG. 1, FIG. 2A (not shown) taken along line 2A—2A being a mirror image thereof.

FIG. 3 is a sectional plan view (looking downwardly) taken along lines 3—3 of FIGS. 2 and 4.

FIG. 4 is a sectional elevational view (looking rearwardly) taken along lines 4—4 of FIGS. 2 and 3.

FIG. 5 is a schematic view directed to a remotely controlled actuation means for the reciprocatable restraining-tongue constituent of the present invention.

Referring now to the drawings, FIG. 1 designates a top plan view of a self-propelled tractor 10 removably pivotably attached along a vertical pivot-axis (as through upright kingpin 28) to a longitudinally rearwardly extending trailer 30. Conventional tractor 10 includes a forwardly disposed operator's cab 11 and a set of rear drive wheels 12 which support the rear end of a tractor chassis composed of a pair of longitudinal horizontal beams 13. Mounted on the chassis 13 between the rear drive wheels 12 is a fifth wheel assembly unit (designated generally as 20) for removably coupling tractor 10 to trailer 29–30 via kingpin 28. The underlying base means for the trailer typically comprises several interconnected horizontal channel-irons including a pair of longitudinal-irons 31 and a plurality of transverse-irons 32. Horizontal decking 33 rests upon the transverse-irons 32 and provides an internal floor for trailer 30, which trailer also has upright walls including a transversely extending front-wall 34 and a pair of longitudinally extending side-walls 31A. The trailer 30 has on its frontal (34) underside (and attached to the transverse channel-irons 32) the usual sturdy horizontal base-plate 29, which rests upon the fifth wheel unit 20 (at skid-plate 25). Herein, trailer 30 has a kingpin coupling 28 which projects rigidly downwardly from trailer underlying baseplate 29 and into fifth wheel assembly 20 for removably pivotably connecting the front of tractor-drawn trailer 30.

The fifth wheel assembly 20 includes a horizontal rest-plate 21 which rests upon and is attached to the longitudinal chassis beams 13 generally between the tractor rear wheels 12. At its sides, rest-plate 21 has integrally attached thereto a pair of upright trunnion-brackets 22 receiving and confining the ends of a horizontal trunnion-shaft 23 which extends between them. Trunnion-shaft 23 in turn serves as a journal for a pair of triangular side-brackets 24 integrally depending from skid-plate 25. The skid-plate 25 part of assembly 20 possesses the conventional sturdy one-pice metallic contruction which typically includes a generally circular forward major portion 25F and a bifurcate rearward portion as a pair of longitudinally rearwardly extending horizontal guide-lugs 26. The respective guide-lugs 26 have rearwardly diverging inward-sides 26A terminating at transversely opposed rear-tips 26R to provide a V-slot 27 forwardly converging for a longitudinal-length "VL" from the rear-tips 26R to the kingpin 28. The skid-plate V-slot portion 27 forward terminus typically takes the form of a circular hole 27H sized slightly larger than kingpin 28. Removable pivotal connection between the depending vertical-axial kingpin (28) component of trailer assembly 29–30 and fifth wheel assembly 20 is normally effected through a latch-lug 20A which is manually engageable and disengageable about kinpin 28 with hand-lever 20B that forwardly underlies skid-plate 25.

Thus, removable pivotal connection between the fifth wheel assembly 20 of tractor 10 and trailer kingpin 28 allows the trailer 30 to pivot in both directions of the tractor-trailer vertical pivot-axis (e.g. at 28). For example, FIG. 1 solid line indicates the trailer longitudinal central-axis 30A extending along a vertical-plane collinear with tractor 10, phantom lines indicating the trailer 30 pivotal conditions about kingpin 28. In certain panic situations, evidencing potential jackknifing as indicated in FIG. 1 phantom lines, the trailer central-axis 30A should not be allowed to deviate more than W° about kingpin pivot-axis 28, the numerical value of W° being typically within the range of 5° to 15°, and substantially some 10°. Within these angular values, disastrous jackknifing situations might ordinarily be avoided.

It is the general purpose of the present invention to provide anti-jackknifing means for combination with tractor-trailer type vehicles whereby the trailer central-axis 30A is not allowed to deviate more than an arbitrarily prescribed W° angular value with respect to the pivot-axis (e.g. kingpin 28). The W° angular value is within the range of 5°–15°, and preferably some 10°, which is consistent with manageable trailer momentums during swerving. As will be hereinafter pointed out in greater detail, the anti-jackknifing apparatus comprises a generally horizontal longitudinally extending elongate restraining-tongue (40) terminating as a forward head-part (40F), which head-part has an inactive normal-station and also an anti-jackknifing extended-station respectively located remote from and abuttably within the skid-plate V-slot 27. The restraining-tongue (40) is remotely controllably actuatable from the tractor operator's cab (11) and at extended-station the restraining-tongue is rigidly and stationarily irresistably attached to the trailer (30) underside. Thus, at extended-station (phantom line in FIGS. 2 and 3), the restraining-tongue head-part (40F) is firmly abuttable against the inward-sides 26A of V-slot 27 thereby preventing further pivoting of trailer 30 about its pivot-axis (28) to preclude jackknifing. The W° value depends upon the predetermined extended-station of head-part (40F) along V-slot longitudinal-length VL. After the jackknifing situation is averted, then of course, the restraining-tongue head-part (40F) is then remotely controllably reciprocated back to the inactive normal-station (solid lines in FIGS. 2 and 3).

In the embodiment 40 thereof shown in the drawing, the reciprocation path for the restraining-tongue is longitudinally horizontally linear and directionally forwardly from a rearward normal-station to the anti-jackknifing extended-station located within the V-slot 27. The restraining-tongue embodiment 40 depicted takes the form of a sturdy monolithic lineal metallic bar having a clevis tail-end 41 and a forward head-end 42 as the forward terminus for head-part 40F. For most skid-plates (25) the V-slot 27 is defined by lineal flat inward-sides (26A), and hence, the restraining-tongue is preferably of regular rectangular cross-sectional shape and size. In a related vein, the head-part (40F) is tapered forwardly toward the head-end 42, preferably at an angular value Y° which is equal to the angle formed by the skid-plate inward-sides 26A. Thus, broad affirmative abuttment contact is possible between the planar inward-sides 26A and the head-part planar tapered faces 43 at the anti-jackknifing extended-station, as the trailer (30) pivots W° about the pivot-axis (28).

For the longitudinally horizontally linearly reciprocatable type restraining-tongue (40), there is necessarily a rigidly stationary slideway which allows the restraining-tongue to reciprocate between normal-station and extended-station and which provides a rigid non-pivoting connection to the trailer for the restraining-tongue at extended-station. The slideway embodiment 50 is a sturdy rectangular metallic collar located beneath and rigidly attached to the trailer underside (e.g. 32). Slideway collar 50 surrounds a substantial length proportion of restraining-tongue 40, collar 50 being located wholly rearwardly of the head-end 42 at normal-station and wholly forwardly of the tail-end 41 at extended-station. Rigid and non-pivotal connection of the collar slideway 50 to the trailer underside is herein effected with multi-perforate rectangularly-crossectioned horizontal bars conforming to the internal side of transverse channel-irons 32 and affixed thereto with horizontal bolts 58. Completing herein a sturdy and non-pivotal utile connection between collar slideway 50 and the trailer underside (30–32) is a pair of sturdy angular brackets including an L-shaped bracket 56 and a longitudinally elongated U-shaped bracket 55 which brackets are attached to the irons 32 and through transverse bars 59 with said bolts 58. The respective brackets 55 and 56 have a plurality of spaced vertical holes 54 for passage of upright bolts 57 to permit selection of the distance between collar 50 and skid-plate 25. As already alluded to, the location of the restraining-tongue head-part at extended-station within the skid-plate V-slot 27 influences the important W° angular value and also the jackknife-stopping leverage (measured along finite-length VL). Accordingly, the distance of the stationary slideway collar 50 relative to kingpin 28 must be empirically selected for installation at the trailer underside site.

There are actuation means for causing the restraining-tongue forward head-part to reciprocate between normal-station and extended-station. The actuation means comprises: a powering means attached to the trailer for powerably reciprocating the restraining-tongue; and a control means at the tractor operator's cab for remotely controlling the powering means. The powering means might be aptly selected such as air-powered, hydraulic-powered, electric-powered, etc. For the horizontally longitudinally reciprocatable linear restraining-tongue 40 illustrated, an air-powered piston 60 is employed. Piston 60 conventionally comprises a cylindrical casing 61 which is rigidly stationarily attached (as with bolts 62) to the trailer underside channel-irons 32. Piston 60 also includes a longitudinally reciprocatable horizontal plunger 65 having an enlarged rearward circular shoulder 66 slidably associated within casing 61 and a fore-end 67 which is attached to the restraining-tongue (40) as by pin 68. A helical spring 64 surrounding plunger 65 within casing 61 tends to maintain the plunger fore-end 67 rearwardly retracted toward the casing 61.

Typical control means herein comprises an elongate airline 70 leading from a source "R" of compressed-air, thence through on-off valve "V", and finally communicating within piston casing 61 to the rear pf plunger shoulder 66. There is also a pressure-relief valve "V.REL." which along with valve V are controlled with switch "S" by the operator/driver from within tractor cab 11. Thus, whenever the tractor operator senses a panic situation wherein trailer (30) begins to swerve and jackknife about the pivot-axis (28), he actuates switch S to allow compressed-air to move plunger 65 forwardly. Plunger 65 moves restraining-tongue 40 longitudinally forwardly whereby head-part 40F assumes extended-station located within skid-plate V-slot 27 and subsequently firmly abuts the guide-lugs' inward-sides 26A. Inasmuch as collar slideway 50 is rigidly and non-pivotably attached to trailer 30, so co-rigid is restraining-tongue 40, and continued swerving and jackknifing of the trailer (30) is precluded. Upon averting of jackknifing, the operator/driver through switch S vents the compressed-air at V.REL. and spring 64 causes restraining-tongue head-part 40F to reassume its normal-station where the head-part remains during ensuring roadway travel (until another panic situation occurrs).

From the foregoing, the construction and operation of the trailer anti-jackknifing apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. Trailer anti-jackknifing apparatus in combination with conventional tractor-drawn trailer wherein the tractor includes a forwardly disposed operator's cab and a rearwardly disposed fifth wheel assembly unit having a substantially horizontal skid-plate, the skid-plate comprising a generally circular forward major portion and a pair of longitudinally horizontally extending guide-lugs having rearwardly divergent inward-sides and terminating at transversely opposed rear-tips to provide an elongate angular V-slot including said lineal inward-sides forwardly converging for a longitudinal finite-length from the rear-tips to a secureable kingpin extending along the tractor-to-trailer vertical pivot-axis, the trailer longitudinally extending horizontal underside including a frontal base-plate carrying a said depending upright kingpin and the trailer underside also extending longitudinally lengthily rearwardly from and in pivotably associated relationship with the tractor through said kingpin vertical-axis, said anti-jackknifing apparatus comprising:

A. A generally horizontal longitudinally extending elongate restraining-tongue terminating as a monolithic forward head-part having a permanently fixed angular taper equal in angular value to that of the skid-plate V-slot, said restraining-tongue being located beneath the trailer underside and attached to the trailer rearwardly of the kingpin, said restraining-tongue head-part having an inactive normal-station and also having an anti-jackknifing extended-station respectively located remote from and within the skid-plate V-slot;

B. A horizontally longitudinally extending stationary slideway surrounding the said restraining-tongue, said slideway being located wholly rearwardly of the skid-plate V-slot and being rigidly and non-pivotably attached to the trailer underside; and C. Actuation means for causing the restraining-tongue forward monolithic head-part to reciprocate between said normal-station and said extended-station, said restraining-tongue actuation means including a control means located within the tractor operator's cab and hence forwardly remote from the fifth wheel unit skid-plate.

2. The trailer anti-jackknifing apparatus of claim 1 wherein the restraining-tongue is forwardly linearly extendable in a horizontal longitudinal path from a rearward normal-station to a forward extended-station, said restraining-tongue including a head-end and a tail-end; and wherein the actuation means includes a powering means attached to the restraining-tongue and located rearwardly of the tail-end thereof, said powering means also being located below and attached to the trailer underside.

3. The trailer anti-jackknifing apparatus of claim 2 wherein the skid-plate V-slot has lineal inward-sides; and wherein the horizontal restraining-tongue monolithic head-part is of rectangular cross-sectional shape.

4. The trailer anti-jackknifing device of claim 3 wherein the restraining-tongue head-part at extended-station is located within the V-slot between the kingpin and the guide-lugs opposed rear-tips; and wherein the restraining-tongue head-part is tapered forwardly toward the head-end and at an angular value substantially equal to the V-slot whereby broad abutment contact exists at forward extended-station between a single inward-side of the V-slot and the tapered head-part of the restraining-tongue.

5. The trailer anti-jackknifing apparatus of claim 2 wherein the stationary slideway surrounds the restraining-tongue and is located wholly rearwardly of the head-end when the restraining-tongue is at the rearward inactive normal-station.

6. The trailer anti-jackknifing apparatus of claim 5 wherein the restraining-tongue is removably attached to the powering means and thence slideably disengageable from the slideway.

7. The trailer anti-jackknifing apparatus of claim 2 wherein the powering means is of the fluid-actuated piston type including a casing portion stationarily attached to the trailer and a longitudinally forwardly movably extendable horizontal plunger which is attached in co-reciprocatable relationship to the restraining-tongue.

8. The trailer anti-jackknifing apparatus of claim 7 wherein the powering means plunger portion is removably attached to the restraining-tongue, the powering means being of the air-actuated piston type including hoseline connections to an air reservoir and the control means in the tractor, the powering means including a spring means portion tending to urge the reciprocatable plunger rearwardly into the surrounding casing portion.

9. The trailer anti-jackknifing apparatus of claim 5 wherein the horizontal restraining-tongue and the surrounding stationary slideway are of rectangular cross-sectional shape; wherein the longitudinal position of the stationary slideway along the trailer underside is selectively variable and rigidly attachable thereat; and wherein the powering means is removably attached both to the trailer underside and to the restraining-tongue tail-end.

10. Trailer anti-jackknifing apparatus in combination with a tractor-drawn trailer which tractor includes a forwardly disposed operator's cab and a rearwardly disposed fifth wheel assembly having a substantially horizontal skid-plate, the skid-plate comprising an elongate angular V-slot including lineal inward-sides converging toward the tractor-to-trailer vertical pivot-axis connection, the trailer longitudinally extending horizontal underside extending lengthily longitudinally rearwardly from and in pivotably associated relationship with the tractor through said vertical pivot-axis connection, said anti-jackknifing apparatus comprising:

A. A generally horizontal longitudinally extending elongate monolithic restraining-tongue terminating as a forward head-part having an angular taper, the restraining-tongue being located beneath the trailer underside and securely attached to the trailer, said restraining-tongue head-part having an inactive normal-station and also having an anti-jackknifing extended-station respectively located wholly rearwardly remote from and abuttably within the skid-plate elongate V-slot and rearwardly of a kingpin type pivot-axis, said restraining-tongue at extended-station being rigidly and nonpivotably associated with the trailer; and B. Actuation means for causing the restraining-tongue including the monolithic forward head-part thereof to reciprocate between said normal-station and said extended-station, said restraining-tongue actuation means including a control means located within the tractor operator's cab and hence forwardly remote of the slotted skid-plate of the tractor.

11. The trailer anti-jackknifing apparatus of claim 10 wherein there is a stationary slideway for the elongate restraining-tongue, which slideway is rigidly attached at a selectable longitudinal location to the trailer underside; and wherein the actuation means includes a powering means attached to the restraining-tongue and located rearwardly thereof, said powering means also being located below and attached to the trailer underside.

* * * * *